(12) United States Patent
Choi et al.

(10) Patent No.: US 11,094,987 B2
(45) Date of Patent: Aug. 17, 2021

(54) BATTERY PACK TO SUPPORT AND FIX BATTERY MODULE

(71) Applicant: LG CHEM, LTD., Seoul (KR)

(72) Inventors: Hyun-Chul Choi, Daejeon (KR); Jun-Kyu Park, Daejeon (KR); Jun-Yeob Seong, Daejeon (KR)

(73) Assignee: LG Chem, Ltd., Seoul (KR)

( * ) Notice: Subject to any disclaimer, the term of this patent is extended or adjusted under 35 U.S.C. 154(b) by 283 days.

(21) Appl. No.: 16/031,381

(22) Filed: Jul. 10, 2018

(65) Prior Publication Data

US 2019/0020004 A1    Jan. 17, 2019

(30) Foreign Application Priority Data

Jul. 13, 2017  (KR) .................. 10-2017-0089131

(51) Int. Cl.
*H01M 50/20* (2021.01)
*H01M 10/04* (2006.01)
*H01M 50/00* (2021.01)
*H01M 50/543* (2021.01)

(52) U.S. Cl.
CPC ......... *H01M 50/20* (2021.01); *H01M 10/045* (2013.01); *H01M 10/0459* (2013.01); *H01M 50/543* (2021.01); *H01M 50/00* (2021.01); *H01M 2220/20* (2013.01)

(58) Field of Classification Search
CPC .... H01M 2/1077; H01M 2/30; H01M 10/045; H01M 10/0459; H01M 2220/20; H01M 2010/4278; H01M 2/10; H01M 2/00; H01M 50/20; H01M 50/543; H01M 50/00; Y02E 60/10; Y02T 10/70

See application file for complete search history.

(56) References Cited

U.S. PATENT DOCUMENTS

| | | | |
|---|---|---|---|
| 8,551,643 B2 * | 10/2013 | Takeshita | H01M 2/1055 429/164 |
| 2005/0058890 A1 * | 3/2005 | Brazell | H01M 2/1094 429/99 |
| 2005/0058899 A1 * | 3/2005 | Rivetta | H01M 10/0413 429/176 |
| 2010/0255363 A1 | 10/2010 | Yoon et al. | |
| 2015/0072193 A1 * | 3/2015 | Balk | H01M 2/22 429/82 |
| 2018/0053922 A1 * | 2/2018 | Van Roon | H01M 2/1094 |
| 2019/0296292 A1 | 9/2019 | Eom et al. | |

FOREIGN PATENT DOCUMENTS

| | | |
|---|---|---|
| KR | 20-1999-000350 U | 1/1999 |
| KR | 1999-0050734 A | 7/1999 |
| KR | 10-2007-0081584 A | 8/2007 |
| KR | 10-1066235 B1 | 9/2011 |
| KR | 10-2015-0042463 A | 4/2015 |
| KR | 10-2015-0062800 A | 6/2015 |
| KR | 10-2016-0019664 A | 2/2016 |

* cited by examiner

*Primary Examiner* — Kwang Han
(74) *Attorney, Agent, or Firm* — Morgan, Lewis & Bockius LLP

(57) ABSTRACT

Disclosed is a battery pack, which includes a battery module having a plurality of battery cells; a pack housing configured to accommodate the battery module; and a flexible rib formed at an inner side of the pack housing and having elasticity, the flexible rib pressing the battery module in contact with the battery module.

11 Claims, 7 Drawing Sheets

BATTERY PACK TO SUPPORT AND FIX BATTERY MODULE

TECHNICAL FIELD

The present application claims priority to Korean Patent Application No. 10-2017-0089131 filed on Jul. 13, 2017 in the Republic of Korea, the disclosures of which are incorporated herein by reference.

The present disclosure relates to a battery pack, more particularly, to a battery pack at which a battery module is capable of being completely supported and fixed when the battery module is mounted to a pack housing.

BACKGROUND ART

As technology development and demand for a mobile device have increased, demand for a secondary battery as an energy source has rapidly increased. Conventionally, a nickel-cadmium battery or a hydrogen ion battery has been used as the secondary battery. However, a lithium secondary battery is recently widely used because charging and discharging is free due to rare memory effect in comparison with a nickel-based secondary battery, a self-discharge rate is very low, and an energy density is high.

The lithium secondary battery mainly uses a lithium oxide and a carbonaceous material as a positive electrode active material and a negative electrode active material, respectively. The lithium secondary battery includes an electrode assembly in which a positive electrode plate and a negative electrode plate, respectively coated with the positive electrode active material and the negative electrode active material, are arranged with a separator therebetween, and an outer member, that is a battery case, which seals and receives the electrode assembly together with an electrolyte solution.

The lithium secondary battery includes a positive electrode, a negative electrode, and a separator interposed therebetween and an electrolyte. Depending on which material is used for the positive electrode active material and the negative electrode active material, the lithium secondary battery is classified into a lithium ion battery (LIB) and a polymer lithium ion battery (PLIB). Generally, an electrode of the lithium secondary battery is prepared by applying the positive or negative electrode active material to a current collector made of aluminum or copper sheet, mesh, film, foil, or the like and then drying the same.

FIG. 1 is an exploded perspective view schematically showing a conventional battery pack, and FIG. 2 is a plane view and a partially enlarged view schematically showing that a battery module is mounted to a pack housing at the conventional battery pack.

Referring to FIGS. 1 and 2, a battery module 2 is inserted into and mounted to a pack housing 1. At this time, a rib 3 for supporting and fixing the battery module 2 is formed at the pack housing 1. In order to prevent the battery module 2 from colliding and interfering with the rib 3 when the battery module 2 is inserted, a gap 4 of a predetermined distance is formed between the battery module 2 and the rib 3. However, due to the presence of the gap 4, if the battery module 2 mounted to the pack housing 1 is moved due to an external force, the moving battery module 2 collides with the rib 3, which causes damage to the battery module 2 and the rib 3.

RELATED LITERATURES

Patent Literature (Patent Literature) Korean Unexamined Patent Publication No. 10-2015-0042463 (published on Apr. 21, 2015)

DISCLOSURE

Technical Problem

The present disclosure is directed to providing a battery pack, which may allow a battery module to be completely supported and fixed when the battery module is mounted to a pack housing.

In addition, the present disclosure is directed to providing a battery pack, which may prevent the battery module from moving and colliding at the inside of the pack housing and thus prevent the battery module from being damaged.

Technical Solution

In one aspect of the present disclosure, there is provided a battery pack, comprising: a battery module having a plurality of battery cells; a pack housing configured to accommodate the battery module; and a flexible rib formed at an inner side of the pack housing and having elasticity, the flexible rib pressing the battery module in contact with the battery module.

Also, the flexible rib may be formed on at least one wall surface of the pack housing and have a slope with respect to the one wall surface.

In addition, the flexible rib may be provided in a pair, and the pair of flexible ribs may have slopes in opposite directions based on a virtual vertical line with respect to the one wall surface.

Also, the pair of flexible ribs may be formed symmetrically to each other based on the virtual vertical line.

In addition, a coupling groove may be formed at one wall surface of the pack housing, and the flexible rib may be coupled to the coupling groove.

Also, a blade portion may be formed at an end of the flexible rib to contact the battery module.

In addition, the blade portion may be a linear portion having a straight shape.

Also, the blade portion may be a rounded portion having a curved shape.

In addition, the blade portion may be an overlapping portion that extends from the end of the flexible rib, is bent and overlaps with one side of the flexible rib.

Meanwhile, in another aspect of the present disclosure, there is also provided a vehicle comprising the battery pack described above.

Advantageous Effects

According to the embodiments of the present disclosure, since the flexible rib formed at the pack housing is elastically deformable, when the battery module is mounted to the pack housing, the battery module may be completely supported and fixed by the flexible rib.

In addition, since the flexible rib fixes the battery module in contact with battery module, it is possible to prevent the battery module from moving and colliding at the inside of the pack housing and thus prevent the battery module from being damaged.

BEST MODE

Figure 1:
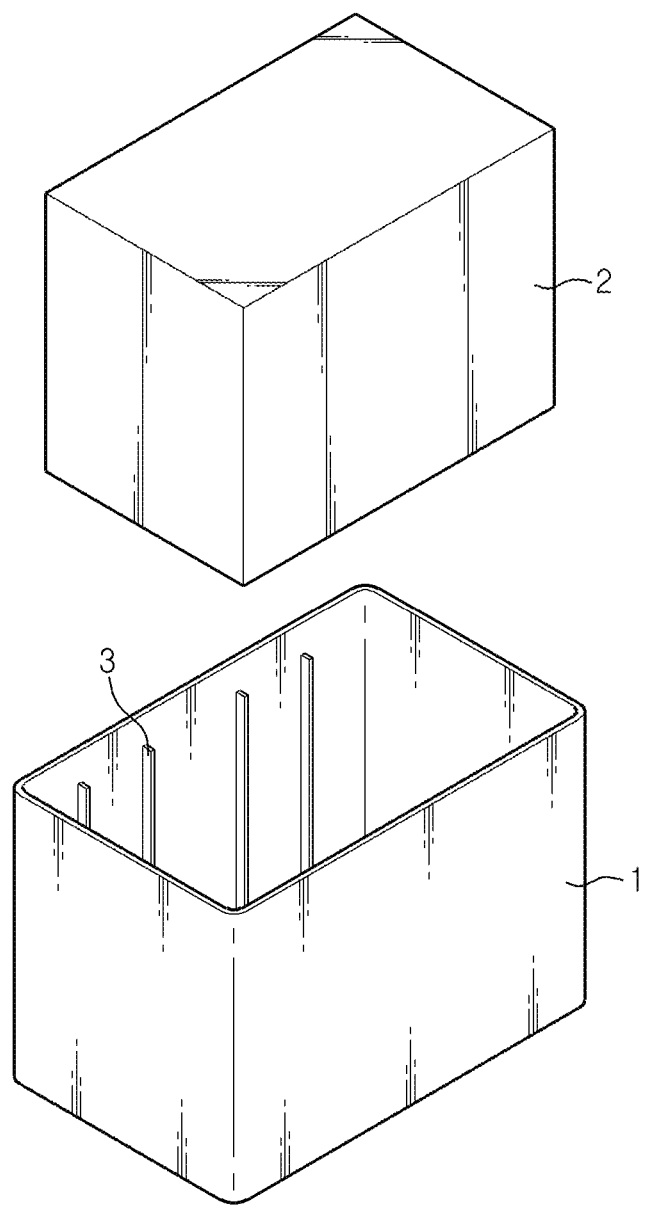
FIG. 1 is an exploded perspective view schematically showing a conventional battery pack.
Figure 2:
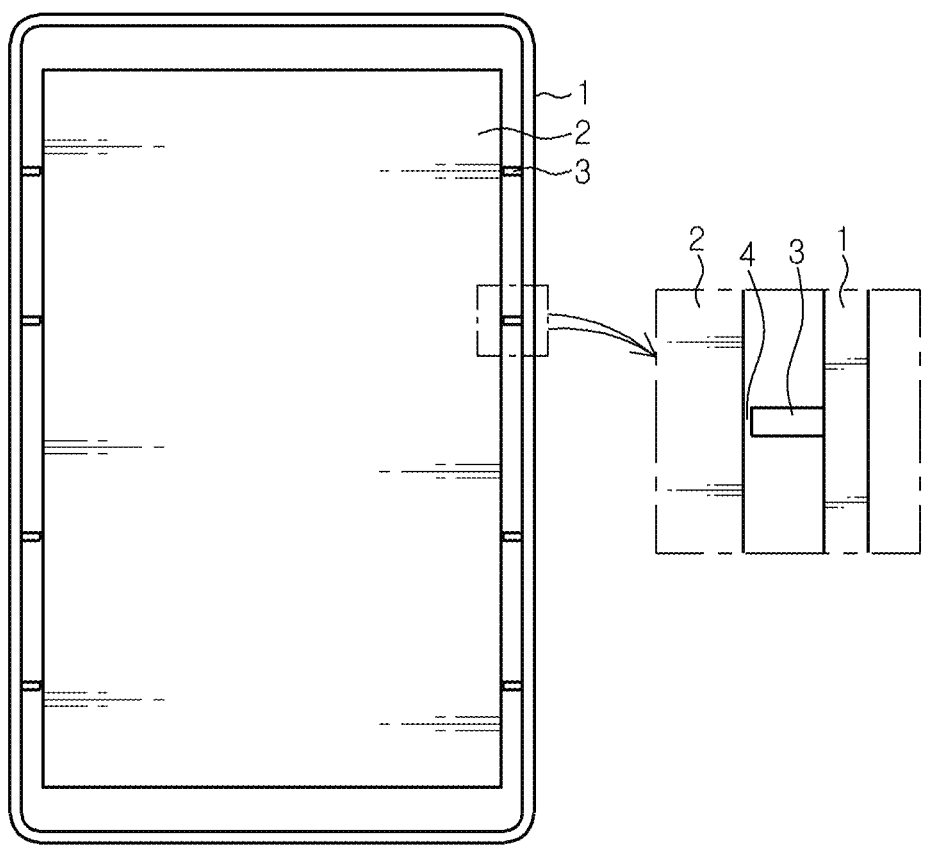
FIG. 2 is a plane view and a partially enlarged view schematically showing that a battery module is mounted to a pack housing at the conventional battery pack.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In the drawings, the size of each element or a specific part of the element may be exaggerated, omitted, or schematically illustrated for convenience and clarity of a description. Thus, the size of each element does not entirely reflect the actual size of the element. A detailed description of well-known functions or elements associated with the present disclosure will be omitted if it unnecessarily obscures the subject matter of the present disclosure.

The term, 'combine' or 'connect' as used herein, may refer not only to a case where one member and another member are directly combined or directly connected but also a case where one member is indirectly combined with another member via a connecting member or is indirectly connected.

Figure 3:
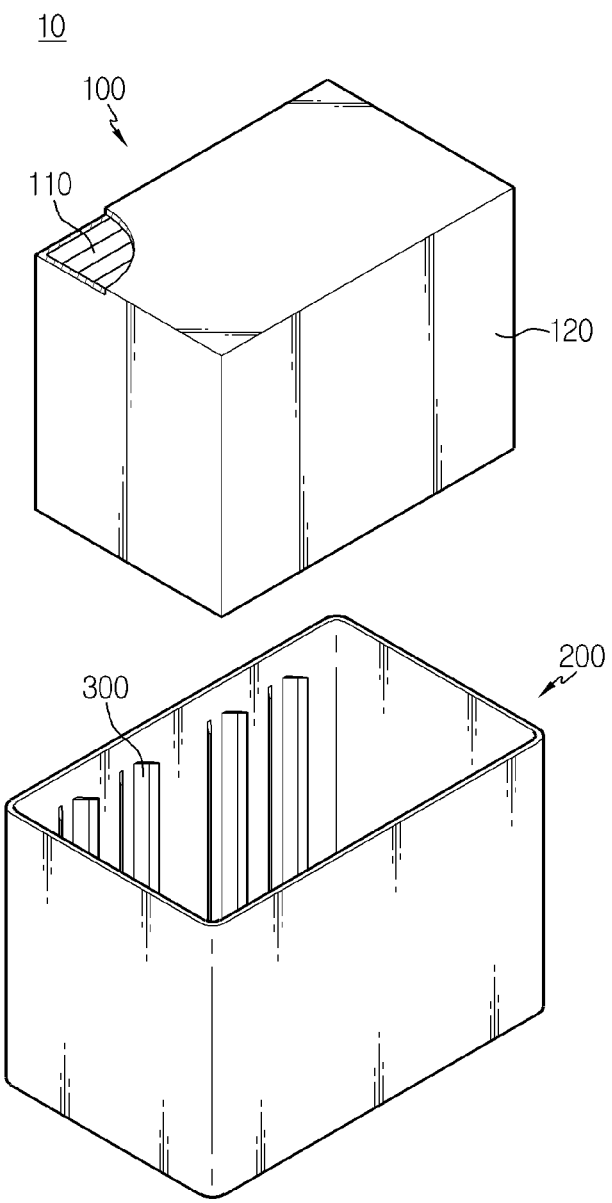
FIG. 3 is an exploded perspective view schematically showing a battery pack according to the first embodiment of the present disclosure.
Figure 4:
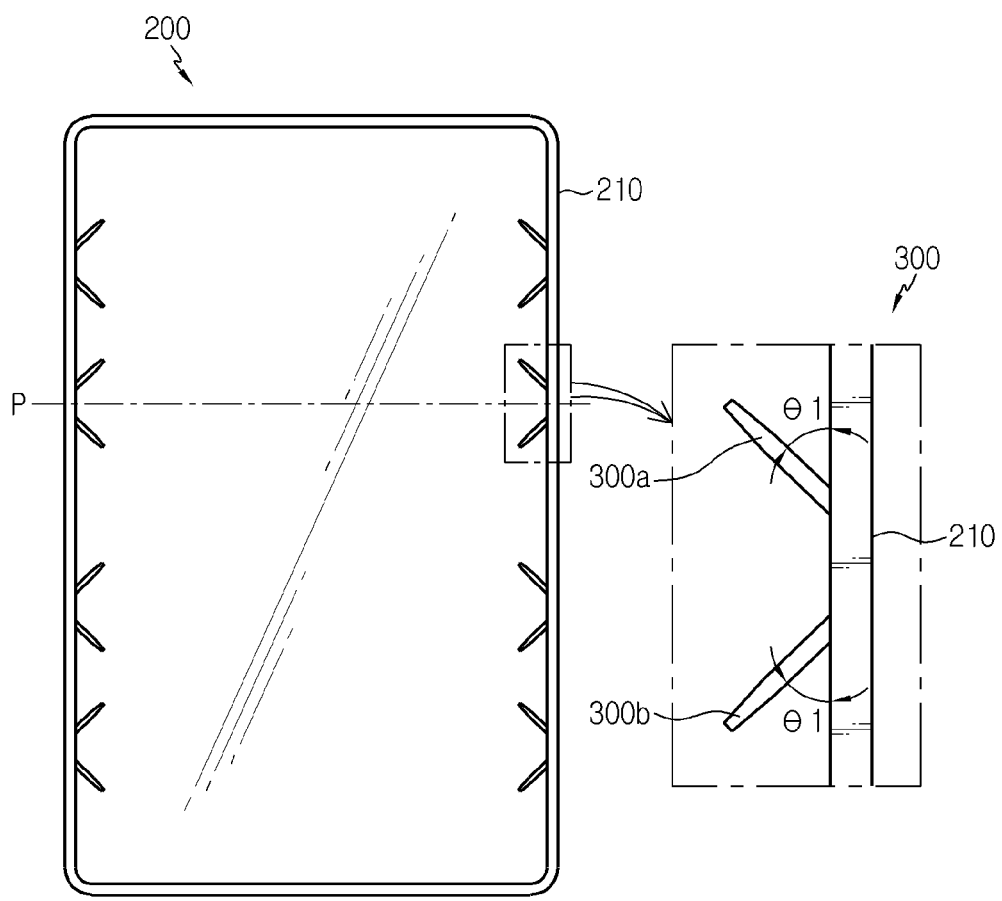
FIG. 4 is a plane view and a partially enlarged view schematically showing a state where a battery module is not mounted to a pack housing at the battery pack according to the first embodiment of the present disclosure.
Figure 5:
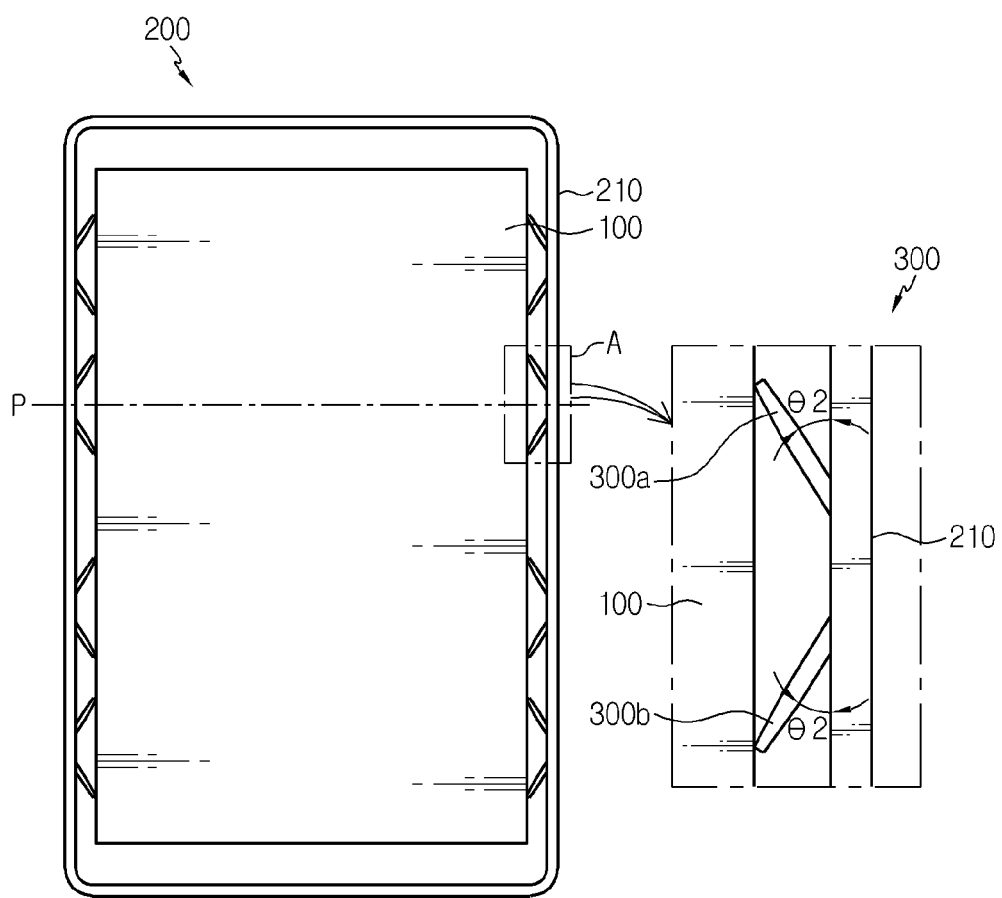
FIG. 5 is a plane view and a partially enlarged view schematically showing that the battery module is mounted to the pack housing at the battery pack according to the first embodiment of the present disclosure.

FIG. 3 is an exploded perspective view schematically showing a battery pack according to the first embodiment of the present disclosure, FIG. 4 is a plane view and a partially enlarged view schematically showing a state where a battery module is not mounted to a pack housing at the battery pack according to the first embodiment of the present disclosure, and FIG. 5 is a plane view and a partially enlarged view schematically showing that the battery module is mounted to the pack housing at the battery pack according to the first embodiment of the present disclosure. In FIG. 3, the battery module is partially sectioned to show a battery cell.

Referring to FIGS. 3 to 5, a battery pack 10 according to the first embodiment of the present disclosure includes a battery module 100, a pack housing 200, and a flexible rib 300 formed at the pack housing 200.

The battery module 100 may include a plurality of battery cells 110 and a case 120.

The plurality of battery cells 110 may be provided as a battery cell stack in which the battery cells are stacked on one another. The battery cell 110 may have various structures, and the plurality of battery cells 110 may be stacked in various ways. The battery cell 110 may be configured so that a plurality of unit cells, in each of which a positive electrode plate, a separator and a negative electrode plate are arranged in order, or a plurality of bi-cells, in each of which a positive electrode plate, a separator, a negative electrode plate, a separator, a positive electrode plate, a separator and a negative electrode plate are arranged in order, are stacked suitable for a battery capacity.

The battery cell 110 may have an electrode lead. The electrode lead is a type of terminal that is exposed to the outside and connected to an external device and may be made of a conductive material. The electrode lead 111 may include a positive electrode lead and a negative electrode lead. The positive electrode lead and the negative electrode lead may be disposed in opposite directions with respect to the longitudinal direction of the battery cell 110, or the positive electrode lead and the negative electrode lead may be positioned in the same direction with respect to the longitudinal direction of the battery cell 110. Meanwhile, the electrode lead may be electrically connected to a bus bar.

The battery cell stack may include a plurality of cartridges (not shown) for accommodating the battery cells 110. Each cartridge (not shown) may be fabricated by injection-molding plastic, and a plurality of cartridges (not shown) having an accommodation portion for accommodating the battery cell 110 may be stacked. A cartridge assembly in which a plurality of cartridges (not shown) are stacked may include a connector element or a terminal element. The connector element may include various types of electrical connecting components or connecting components for connecting to, for example, a battery management system (BMS) (not shown) capable of providing data on voltage or temperature of the battery cells 110. In addition, the terminal element includes a positive electrode terminal and a negative electrode terminal as main terminals connected to the battery cell 110, and the terminal element may have a terminal bolt to be electrically connected to the outside. Meanwhile, the battery cell 110 may have various shapes.

The battery cell 110 or the battery cell stack may be accommodated in the case 120. The case 120 surrounds all of the plurality of cartridges accommodating the battery cell stack or the battery cell 110 and protects the battery cell stack or the cartridge assembly from external vibrations or impacts.

The case 120 may be shaped corresponding to the battery cell stack or the cartridge assembly. For example, if the battery cell stack or the cartridge assembly has a hexahedron shape, the case 120 may be provided in a hexahedron shape corresponding thereto. The case 120 may be manufactured, for example, by bending a metal plate or may be manufactured by injection molding a plastic. In addition, the case 120 may be manufactured integrally or may be manufactured by coupling separate plates. In the case 120, a perforation portion (not shown) may be formed so that the connector element or the terminal element described may be exposed to the outside. That is, the connector element or the terminal element may be electrically connected to a predetermined external component or member, and the penetration portion may be formed in the case 120 so that the electrical connection is not obstructed by the case 120.

The battery module 100 is accommodated in the pack housing 200. The pack housing 200 may accommodate a plurality of battery modules 100 or a single battery module 100. Hereinafter, for convenience of explanation, an embodiment where one battery module 100 is accommodated in one pack housing 200 will be described.

The pack housing 200 may be formed in a shape corresponding to the battery module 100. For example, if the battery module 100 has a hexahedron shape, the pack housing 200 may also have a hexahedron shape corresponding thereto.

The flexible rib 300 may be formed at the inside of the pack housing 200 to support the battery module 100 when the battery module 100 is accommodated. Here, the pack housing 200 and the flexible rib 300 may be integrally formed by injection molding.

The flexible rib 300 is formed at an inner side of the pack housing 200 to have elasticity. That is, if the battery module 100 is inserted into the pack housing 200, the flexible rib 300 elastically deforms to contact the battery module 100 and press the battery module 100. The flexible rib 300 may be formed on at least one wall surface 210 of the pack housing 200. That is, the flexible rib 300 may be formed on one or more wall surfaces among the plurality of wall surfaces of the pack housing 200. Here, the flexible rib 300 may be formed to have a slope with respect to the wall surface 210. The slope angle of the flexible rib 300 may vary depending on the size of the pack housing 200 and the battery module 100. Referring to FIGS. 3 to 5, the flexible rib 300 may be provided in a pair. Here, the pair of flexible ribs 300a, 300b may be provided to have slopes in opposite directions based on a virtual vertical line P with respect to the wall surface 210 (see FIG. 4). That is, based on FIG. 4, if one flexible rib 300a of the pair of flexible ribs 300a, 300b is formed to have an upward slope with a predetermined angle with respect to the virtual vertical line P, the other flexible rib 300b of the pair of flexible ribs 300a, 300b may be formed to have a downward slope with the same angle as that the flexible rib 300a with respect to the virtual vertical line P. In addition, the pair of flexible ribs 300a, 300b may have the same length, the same material, and the same slope angle. That is, since the pair of flexible ribs 300a, 300b contact the battery module 100 and transmit the uniform pressing force to the battery module 100, the battery module 100 may be maintained in a fixed state by the balance of forces. That is, the pair of flexible ribs 300a, 300b may be formed symmetrically to each other based on the virtual vertical line P. Referring to FIG. 4, before the battery module 100 is inserted into the pack housing 200, the pair of flexible ribs 300a, 300b maintain a first angle θ1 symmetrically to each other based on the virtual vertical line P, and referring to FIG. 5, when the battery module 100 is inserted into the pack housing 200, the pair of flexible ribs 300a, 300b are elastically deformed by contacting the battery module 100 and maintain a second angle θ2 symmetrically to each other based on the virtual vertical line P. Here, if the pair of flexible ribs 300a, 300b are elastically deformed to maintain the second angle θ2, since the pair of flexible ribs 300a, 300b presses the battery module 100 in contact with the battery module 100, the battery module 100 may be fixed and supported by the balance of forces. Thus, unlike the prior art, a gap is not formed between the battery module 100 and the flexible rib 300, and thus, even though the pack housing 200 moves due to an external force, the battery module 100 is fixed and does not move, thereby preventing the battery module 100 and the rib from being damaged.

Meanwhile, though not shown in the figures, a coupling groove (not shown) may be formed at one wall surface 210 of the pack housing 200, and the flexible rib 300 may be coupled to the coupling groove (not shown). If the coupling groove (not shown) may be formed at the pack housing 200 and the flexible rib 300 is coupled to the coupling groove (not shown), the flexible rib 300 is in contact with the pack housing 200 at a correct position and thus may support the battery module 100 more precisely.

Hereinafter, the operation and effect of the battery pack 10 according to the first embodiment of the present disclosure will be described.

Referring to FIGS. 3 to 5, the pair of flexible ribs 300a, 300b formed symmetrically in opposite directions based on the virtual vertical line P with respect to the wall surface 210 of the pack housing 200 may be provided in the pack housing 200. Since the pair of flexible ribs 300a, 300b have elasticity, when the battery module 100 is inserted into the pack housing 200, the pair of flexible ribs 300a, 300b may be elastically deformed and closely adhered to the battery module 100. Also, if the battery module 100 is mounted to the pack housing 200, the pair of flexible ribs 300a, 300b give a predetermined pressing force to support and fix the battery module 100. By doing so, the battery module 100 may be fully supported and fixed, and the battery module 100 may be prevented from moving, thereby preventing the battery module 100 from being damaged.

Figure 6:
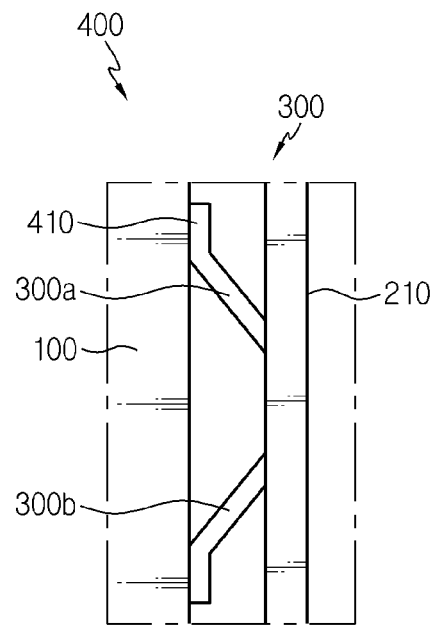
FIG. 6 is a partially enlarged view schematically showing that the battery module is mounted to the pack housing at the battery pack according to the second embodiment of the present disclosure.

FIG. 6 is a partially enlarged view schematically showing that the battery module is mounted to the pack housing at the battery pack according to the second embodiment of the present disclosure. The partially enlarged view of FIG. 6 corresponds to a portion A of FIG. 5.

Hereinafter, the function and effect of a battery pack 10 according to the second embodiment according to the present disclosure will be described with reference to the drawings, but features common to the battery pack 10 according to the first embodiment of the present disclosure will not be described again in detail.

The second embodiment of the present disclosure is different from the first embodiment in the point that a blade portion 400 is further included.

Referring to FIG. 6, the blade portion 400 is formed at an end of the flexible rib 300 and is provided to contact the battery module 100. Here, the blade portion 400 may have various shapes and various angles. However, in this embodiment, the blade portion 400 is a linear portion 410 having a straight shape.

The blade portion 400 may be integrally formed with the flexible rib 300 to extend from the flexible rib 300. If the blade portion 400 is a linear portion 410, the linear portion 410 may be formed in parallel with an outer wall of the battery module 100 and may be closely adhered to the outer wall. That is, if the blade portion 400, namely the linear portion 410, is formed at the flexible rib 300, the contact area with the battery module 100 is relatively increased, thereby fixing and supporting the battery module 100 more effectively.

Figure 7:
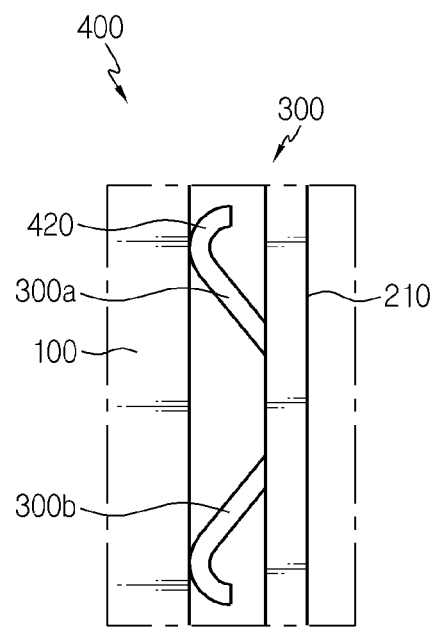
FIG. 7 is a partially enlarged view schematically showing that the battery module is mounted to the pack housing at the battery pack according to the third embodiment of the present disclosure.

FIG. 7 is a partially enlarged view schematically showing that the battery module is mounted to the pack housing at the battery pack according to the third embodiment of the present disclosure. The partially enlarged view of FIG. 7 corresponds to a portion A of FIG. 5.

Hereinafter, the function and effect of a battery pack 10 according to the third embodiment according to the present disclosure will be described with reference to the drawings, but features common to the battery pack 10 according to the first or second embodiment of the present disclosure will not be described again in detail.

The third embodiment of the present disclosure is different from the first embodiment in the point that a blade portion 400 is further included and is different from the second embodiment in the point that the blade portion 400 is provided as a rounded portion 420.

Referring to FIG. 7, the blade portion 400 may be a rounded portion 420 having a curved shape, and particularly, a region contacting the outer wall of the battery module 100 is rounded. The rounded portion 420 formed in this manner may reduce the interference between the battery module 100 and the blade portion 400 when the battery module 100 is inserted into the pack housing 200.

Figure 8:
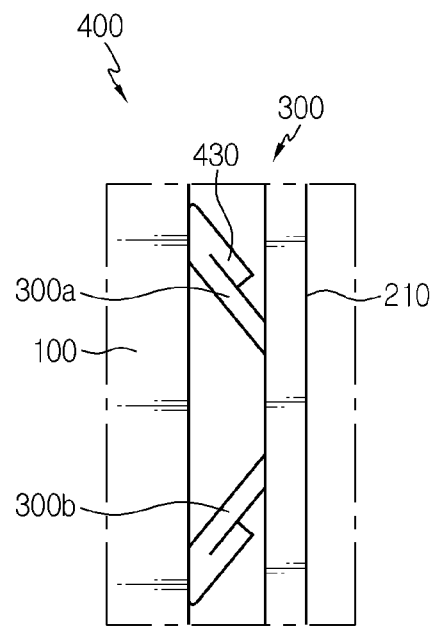
FIG. 8 is a partially enlarged view schematically showing that the battery module is mounted to the pack housing at the battery pack according to the fourth embodiment of the present disclosure.

FIG. 8 is a partially enlarged view schematically showing that the battery module is mounted to the pack housing at the battery pack according to the fourth embodiment of the present disclosure. The partially enlarged view of FIG. 8 corresponds to a portion A of FIG. 5.

Hereinafter, the function and effect of a battery pack 10 according to the fourth embodiment according to the present disclosure will be described with reference to the drawings, but features common to the battery pack 10 according to the first to third embodiments of the present disclosure will not be described again in detail.

The fourth embodiment of the present disclosure is different from the first embodiment in the point that a blade portion 400 is further included and is different from the second and third embodiments in the point that the blade portion 400 is provided as an overlapping portion 430.

Referring to FIG. 8, the blade portion 400 may be an overlapping portion 430 that extends from the end of the flexible rib 300 and is bent and overlaps with one side of the flexible rib 300. That is, since the overlapping portion 430 serving as the blade portion 400 overlaps with the pair of flexible ribs 300a, 300b, respectively, the strength of the flexible rib 300 may be improved. In addition, since the contact area between the overlapping portion 430 and the battery module 100 is relatively increased, it is possible to fix and support the battery module 100 more effectively.

It should be understood that each embodiment described above may be modified for various causes and reasons, such as the size, weight or material of the battery module 100 or the pack housing 200, the kinds of object to which battery pack 10 is applied, or the like.

Meanwhile, a vehicle (not shown) according to an embodiment of the present disclosure may include the battery pack 10 described above. The battery pack 10 may be applied to a variety of machines or devices that use electricity, for example an electric vehicle. Here, the electric vehicle may include not only an electric vehicle purely driven by electricity but also a hybrid electric vehicle using other energy together with electric energy.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

REFERENCE SIGNS

| | |
|---|---|
| 10: battery pack | 100: battery module |
| 110: battery cell | 120: case |
| 200: pack housing | 210: wall surface |
| 300: flexible rib | 400: blade portion |
| 410: linear portion | 420: rounded portion |
| 430: overlapping portion | |

What is claimed is:

1. A battery pack, comprising:
a battery module having a case and a plurality of battery cells contained therein;
a pack housing configured to accommodate the battery module; and
a flexible rib formed at an inner side of the pack housing and having elasticity,
wherein the flexible rib is between the pack housing and the case of the battery module, the flexible rib pressing the case of the battery module and being in contact with the case of the battery module, and
wherein the flexible rib comprises a pair of ribs, the pair of ribs comprising:
inner surfaces facing each other and sloping away from each other, and
outer surfaces opposite to the inner surfaces, the outer surfaces being sloped away from each other, and
wherein a closest distance between the pair of ribs is directly on the inner side of the pack housing.

2. The battery pack according to claim 1, wherein the flexible rib is formed on at least one wall surface of the pack housing and has a slope with respect to the one wall surface.

3. The battery pack according to claim 1, wherein the pair of flexible ribs are formed symmetrically to each other based on a virtual vertical line.

4. The battery pack according to claim 1, wherein:
a coupling groove is formed at one wall surface of the pack housing; and
the flexible rib is coupled to the coupling groove.

5. The battery pack according to claim 1, wherein a blade portion is formed at an end of the flexible rib to contact the battery module.

6. The battery pack according to claim 5, wherein the blade portion is a linear portion.

7. The battery pack according to claim 5, wherein the blade portion is a rounded portion.

8. The battery pack according to claim 5, wherein the blade portion is an overlapping portion that extends from the end of the flexible rib, is bent and overlaps with one side of the flexible rib.

9. A vehicle, comprising a battery pack defined in claim 1.

10. The battery pack according to claim 1, wherein the case of the battery module surrounds all of the plurality of battery cells and protects all the plurality of battery cells.

11. The battery pack according to claim 1, wherein, for each of the pair of flexible ribs, the outer surface is respectively parallel to the inner surface.

* * * * *